United States Patent [19]
Read et al.

[11] Patent Number: 4,885,724
[45] Date of Patent: Dec. 5, 1989

[54] CABLELESS SEISMIC DIGITAL FIELD RECORDER HAVING ON-SITE SEISMIC DATA PROCESSING CAPABILITIES

[75] Inventors: Randol R. Read, Tulsa, Okla.; Ralph E. Warmack, Kingwood; James M. Farmer, Austin, both of Tex.; Jerry D. Henshaw, Tulsa; Connie T. Marshall, Muskogee, both of Okla.

[73] Assignee: Amoco Corporation, Chicago, Ill.

[21] Appl. No.: 212,157

[22] Filed: Jun. 23, 1988

Related U.S. Application Data

[63] Continuation of Ser. No. 836,028, Mar. 4, 1986, abandoned, which is a continuation of Ser. No. 454,405, Dec. 29, 1982, abandoned.

[51] Int. Cl.⁴ .......................... G01V 1/16; H04B 17/00
[52] U.S. Cl. ......................................... 367/77; 367/13; 346/33 C; 364/421
[58] Field of Search ........................ 367/13, 14, 21, 22, 367/23, 24, 37, 38, 46, 56, 57, 58, 59, 60, 61, 62, 63, 65, 66, 67, 68, 69, 70, 71, 72, 73, 76, 77; 364/421, 422; 346/33 C

[56] References Cited

U.S. PATENT DOCUMENTS

| | | | |
|---|---|---|---|
| 3,288,242 | 11/1966 | Loeb | 367/184 |
| 3,440,599 | 4/1969 | Waters et al. | 367/184 |
| 3,622,967 | 11/1971 | Foster et al. | 367/42 X |
| 3,806,864 | 4/1974 | Broding et al. | 346/33 C X |
| 3,916,371 | 10/1975 | Broding | 367/78 |
| 3,946,357 | 3/1976 | Weinstein et al. | 367/77 |
| 3,987,406 | 10/1976 | Broding | 340/15.5 TS |
| 4,042,906 | 8/1977 | Ezell | 340/15.5 TS |
| 4,086,504 | 4/1978 | Ezell et al. | 340/15.5 TS |
| 4,157,659 | 6/1979 | Murdock | 364/422 X |
| 4,217,571 | 8/1980 | Hughes et al. | 181/116 X |
| 4,276,620 | 6/1981 | Kahn et al. | 367/60 |
| 4,468,761 | 8/1984 | Rietsh | 367/43 |
| 4,507,735 | 3/1985 | Moorehead et al. | 340/853 |
| 4,561,074 | 12/1985 | Warmack | 367/46 |
| 4,639,901 | 1/1987 | Warmack et al. | 367/77 X |

FOREIGN PATENT DOCUMENTS

| | | |
|---|---|---|
| 2632312 | 4/1977 | Fed. Rep. of Germany . |
| 2407081 | 7/1981 | France . |
| 8002877 | 12/1980 | PCT Int'l Appl. . |
| 1248705 | 10/1971 | United Kingdom . |

OTHER PUBLICATIONS

Soviet Inventions Illustrated Section E1, Week 8420, Jun. 27, 1984, Derwent Publications, Ltd., London SU 1024-791-A.
Ryerson et al., The Development of a Seafloor Earthquake Measurement System, Conference Oceans 78 Challenge, 1978, pp. 692-695.

Primary Examiner—Brian S. Steinberger
Attorney, Agent, or Firm—Timothy D. Stanley

[57] ABSTRACT

An improved cableless seismic digital recording system is disclosed which records seismic-trace data generated by any type of seismic source, including high energy impulsive seismic sources, such as dynamite, and low energy surface seismic sources, such as vibrators and hammers. A seismometer, or geophone, is connected to a remotely deployed radio-controlled portable recorder which contains circuitry for sampling, digitizing, processing, storing, and recording seismic-trace data. Coded radio signals instruct each recorder to commence an operation or sequence of operations from a predetermined set of programmed instructions stored in program read only memory included in each recorder. Such operations include seismic-trace data acquisition; optional weighting and vertical stacking (summing); normalization; recording; and seismic source initiation.

11 Claims, 10 Drawing Sheets

FIG.3B

| WORD NO. | Bits 1-16 | Description |
|---|---|---|
| 1 | C C C C C C C C C C C C C C C C | CONTROL TONE |
| 2 | K8 K4 K2 K1 \| H8 H4 H2 H1 \| T8 T4 T2 T1 \| U8 U4 U2 U1 | FIRST BEGIN STATION |
| 3 | K8 K4 K2 K1 \| H8 H4 H2 H1 \| T8 T4 T2 T1 \| U8 U4 U2 U1 | FIRST END STATION |
| 4 | K8 K4 K2 K1 \| H8 H4 H2 H1 \| T8 T4 T2 T1 \| U8 U4 U2 U1 | SECOND BEGIN STATION |
| 5 | K8 K4 K2 K1 \| H8 H4 H2 H1 \| T8 T4 T2 T1 \| U8 U4 U2 U1 | SECOND END STATION |
| 6 | K8 K4 K2 K1 \| H8 H4 H2 H1 \| T8 T4 T2 T1 \| U8 U4 U2 U1 | SHOT POINT CALL |
| 7 | X \| Y \| 0 0 0 0 0 \| B7 B6 B5 B4 B3 B2 B1 B0 | CRC |
| 8 | K8 K4 K2 K1 \| H8 H4 H2 H1 \| T8 T4 T2 T1 \| U8 U4 U2 U1 | FIRST BEGIN STATION |
| 9 | K8 K4 K2 K1 \| H8 H4 H2 H1 \| T8 T4 T2 T1 \| U8 U4 U2 U1 | FIRST END STATION |
| 10 | K8 K4 K2 K1 \| H8 H4 H2 H1 \| T8 T4 T2 T1 \| U8 U4 U2 U1 | SECOND BEGIN STATION |
| 11 | K8 K4 K2 K1 \| H8 H4 H2 H1 \| T8 T4 T2 T1 \| U8 U4 U2 U1 | SECOND END STATION |
| 12 | K8 K4 K2 K1 \| H8 H4 H2 H1 \| T8 T4 T2 T1 \| U8 U4 U2 U1 | SHOT POINT CALL |
| 13 | X \| Y \| 0 0 0 0 0 \| B7 B6 B5 B4 B3 B2 B1 B0 | CRC |
| 14 | K8 K4 K2 K1 \| H8 H4 H2 H1 \| T8 T4 T2 T1 \| U8 U4 U2 U1 | FILE NUMBER |
| 15 | K8 K4 K2 K1 \| H8 H4 H2 H1 \| T8 T4 T2 T1 \| U8 U4 U2 U1 | SOURCE |
| 16 | U8 U4 U2 U1 \| ——SOURCE FRAC.—— \| ——SPARE—— | |
| 17 | K8 K4 K2 K1 \| H8 H4 H2 H1 \| T8 T4 T2 T1 \| U8 U4 U2 U1 | ADVANCE TIME |
| 18 | K8 K4 K2 K1 \| H8 H4 H2 H1 \| T8 T4 T2 T1 \| U8 U4 U2 U1 | ID1 |
| 19 | K8 K4 K2 K1 \| H8 H4 H2 H1 \| T8 T4 T2 T1 \| U8 U4 U2 U1 | ID2 |
| 20 | K8 K4 K2 K1 \| H8 H4 H2 H1 \| T8 T4 T2 T1 \| U8 U4 U2 U1 | ID3 |
| 21 | K8 K4 K2 K1 \| H8 H4 H2 H1 \| T8 T4 T2 T1 \| U8 U4 U2 U1 | ID4 SELECTED |
| 22 | K8 K4 K2 K1 \| H8 H4 H2 H1 \| T8 T4 T2 T1 \| U8 U4 U2 U1 | LINE |
| 23 | T8 T4 T2 T1 \| U8 U4 U2 U1 \| T8 T4 T2 T1 \| U8 U4 U2 U1 | MONTH — DAY |
| 24 | T8 T4 T2 T1 \| U8 U4 U2 U1 \| T8 T4 T2 T1 \| U8 U4 U2 U1 | YEAR — AREA1 |
| 25 | T8 T4 T2 T1 \| U8 U4 U2 U1 \| T8 T4 T2 T1 \| U8 U4 U2 U1 | AREA2 — AREA3 |
| 26 | X \| Y \| 0 0 0 0 0 \| B7 B6 B5 B4 B3 B2 B1 B0 | CRC |
| 27 | 1 1 1 1 1 1 1 1 1 1 1 1 0 0 0 0 | END OF HEADER FLAG |

Column legend (right side):

- K8/H8/T8/U8 — BIT 8 — BCD
- K4/H4/T4/U4 — BIT 4 — BCD
- K2/H2/T2/U2 — BIT 2 — BCD
- K1/H1/T1/U1 — BIT 1 — BCD

THOUSANDS (K), HUNDREDS (H), TENS (T), UNITS (U)

- C — CONTROL TONE 2000 Hz
- 0 — BINARY ZERO  2500 Hz
- 1 — BINARY ONE   3000 Hz
- X: 0 EQUALS 1ST TRANSMISSION; 1 EQUALS 2ND TRANSMISSION
- Y: 0 EQUALS DATA CALL; 1 EQUALS TEST CALL

4,885,724

CABLELESS SEISMIC DIGITAL FIELD RECORDER HAVING ON-SITE SEISMIC DATA PROCESSING CAPABILITIES

This is a continuation of copending application Ser. No. 836,028 filed on Mar. 4, 1986 now abandoned. This is a continuation of co-pending application Ser. No. 454,405, filed Dec. 29, 1982 now abandoned.

BACKGROUND OF THE INVENTION

This invention relates to geophysical exploration for petroleum and minerals. More particularly, this invention is directed to geophysical prospecting by means of the seismic technique.

Seismic prospecting involves generating seismic waves at the surface of the earth by means of a seismic source. The seismic, waves travel downward into the earth and are reflected and/or refracted due to differences in acoustic impedance at the interfaces of various subsurface geological formations. Detectors, called seismometers, or geophones, located along the surface of the earth and/or in a borehole produce analog electrical seismic-trace signals in response to detected seismic wave reflections and/or refractions. The analog electrical seismic-trace signals from the seismometers, or geophones, can then be recorded. Alternatively, the analog electrical seismictrace signals from the seismometers, or geophones, can be sampled and digitized prior to being recorded. The seismic-trace data recorded in either manner is subsequently processed and analyzed for determining the nature and structure of the subsurface formations. Specifically, this invention is directed to the acquisition and on-site processing of the seismic-trace data, irrespective of the type of seismic source used for imparting seismic energy to the earth. In particular, this invention is directed to the incorporation of on-site seismic-trace data processing capabilities in the recorder of a cableless seismic digital recording system.

Various forms of cableless seismic digital recording systems are known. The cableless seismic digital recording system is a field system developed for seismic prospecting for digitally recording seismic-trace signals produced by seismometers, or geophones, without the need for multi-conductor cables or alternate means such as multi-channel radio telemetry for transmitting seismic-trace data to a central recording point. In particular, the cableless seismic digital recording system includes recorders placed near the seismometer, or geophone, locations and arranged for producing individual recordings in response to control signals transmitted from a control point over a communications link, preferably a radio communications link.

The forerunner of cableless seismic digital recording systems is disclosed in Montgomery U.S. Pat. No. 3,283,295. Montgomery U.S. Pat. No. 3,283,295 discloses a cableless seismic analog recording system wherein a radio receiver is associated with a recorder located at each seismometer, or geophone, location within a prospect area. Each recorder is activated by control signals from a centrally located radio transmitter. There are, however, two deficiencies in the cableless seismic analog recording system disclosed in Montgomery U.S. Pat. No. 3,283,295, namely, (a) recording of the seismic-trace signals as a frequency-modulated magnetic record is inferior to digital recording, which has unexcelled accuracy, dynamic range, and freedom from noise interference; and (b) there is no provision for selectively activating the remotely deployed recorders for any given recording, so that only certain recorders within a larger array can be employed as in the "roll-along" technique of common-depth-point seismic prospecting. Montgomery U.S. Pat. No. 3,283,295 discloses that all remotely deployed recorders are in operation for every recording, and reconfiguration of the array for each new recording involves physically repositioning various recorders along the profile survey line.

Broding et al. U.S. Pat. No. 3,806,864, hereby incorporated by reference into this specification to form a part thereof, discloses a cableless seismic recording system which overcomes the two noted deficiencies of the cableless seismic analog recording system disclosed in Montgomery U.S. Pat. No. 3,283,295 in that the recording produced is digital in format and, out of a large array of recorders remotely deployed in a prospect area, only those recorders needed for producing a given set of recordings are selectively activated and caused to record the seismic-trace data. The remaining recorders remain essentially quiescent until there is a desire to produce a set of recordings for the prospect areas where they are situated. As disclosed in Broding et al. U.S. Pat. No. 3,806,864, the seismic-trace data is preferably recorded on a magnetic tape cartridge.

Now, many techniques for generating and recording seismic waves are currently in use. Exploding-gas and compressed-air guns placed on the surface of the earth and dynamite are examples of high energy seismic sources which generate a sharp pulse (impulse) of seismic energy. Vibrators, which generate a "chirp" signal of seismic energy, and hammers are examples of low energy surface seismic sources. In the case of vibrators, the recorded seismic wave reflections and/or refractions are cross-correlated with a replica (called the "pilot signal") of the original "chirp" signal in order to produce recordings similar to those which would have been produced with a high energy impulsive seismic source. This process is known as "vibroseis."

Considered in more detail, vibroseis seismic prospecting, commercialized by Continental Oil Company, typically employs a large, vehicle-mounted vibrator as a seismic source. The vehicle is deployed to a prospect area, and the vibrator is positioned in contact with the surface of the earth. Thereafter, the vibrator is activated for imparting vibrations to the earth, thereby causing seismic waves to propagate through the subsurface formations. The seismic wave reflections and/or refractions are detected by seismometers, or geophones, deployed in the prospect area.

Advantageously, the use of a vibrator can be more economical than the use of dynamite. Furthermore, as compared to the use of a high energy impulsive seismic source, such as dynamite, the frequency of the seismic waves generated by a vibrator can be selected by controlling the frequency of the pilot signal to the power source, such as a hydraulic motor, which drives the vibrator. More particularly, the frequency of the pilot signal to the vibrator power source can be varied, that is, "swept," for obtaining seismic-trace data at different frequencies. Consider, for example, Doty et al. U.S. Pat. No. 2,688,124 which discloses how a low energy seismic wave, such as generated by a vibrator, can be used effectively for seismic prospecting if the frequency of the vibrator "chirp" signal which generates the seismic wave is swept according to a known pilot signal and the detected seismic wave reflections and/or refractions are cross-correlated with the pilot signal in order to produce seismic-trace recordings similar to those which would have been produced with a high energy impulsive seismic source. Typically, the pilot signal is a swept frequency sine wave which causes the vibrator power source to drive the vibrator for coupling a swept sine wave "chirp" signal into the earth. A typical swept frequency operation can employ, for example, a 10- to 20-second long sine wave "chirp" signal with a frequency sweep of 14 to 56 Hz. The swept frequency operation yields seismic-trace data which enables the different earth responses to be analyzed, thereby providing a basis on which to define the structure, such as the depth and thickness, of the subsurface formations.

Unfortunately, recorded seismic-trace data always includes some background (ambient) noise in addition to the detected seismic waves reflected and/or refracted from the subsurface formations (referred to as "seismic signal"). Ambient noise is not repeatable with or dependent on the seismic source. The ambient noise appears in many forms, such as atmospheric electromagnetic disturbances, wind, motor vehicle traffic in the vicinity of the prospect area, recorder electrical noise, etc.

When a high energy impulsive seismic source is used, such as dynamite, the level of the detected seismic signal is usually greater than the ambient noise. Use of the cableless seismic digital recording system disclosed in Broding et al. U.S. Pat. No. 3,806,864 is most advantageous in instances when seismic-trace data is generated by a high energy impulsive seismic source. This is because the data storage capacity of commercially available magnetic tape cartridges is adequate for recording the seismic-trace data.

However, when a low energy surface seismic source is used, such as a vibrator used in vibroseis seismic prospecting, the ambient noise can be at a level greater than the seismic signal. For that reason, seismic-trace records are often produced involving the repeated initiation of the low energy surface seismic source at about the same origination point, thereby producing a sequence of seismic-trace data based on seismic wave reflections and/or refractions that have traveled over essentially the same path and therefore have approximately the same travel times. Because the data storage capacity of commercially available magnetic tape cartridges such as used in the cableless seismic digital recording system disclosed in Broding et al. U.S. Pat. No. 3,806,864 is limited, the capacity is not always adequate for recording every repetition individually as well as accommodating the increase in record length required when a low energy surface seismic source is used.

In order to obviate the limitaion of the data storage capacity of commercially available magnetic tape cartridges such as used in the cableless seismic digital recording system disclosed in Broding et al. U.S. Pat. No. 3,806,864, seismic-trace data generated by low energy surface seismic sources can be vertically stacked (summed, or composited) prior to recording in order to economize tape usage. Weinstein et al. U.S. Pat. No. 3,946,357 and Broding U.S. Pat. No. 4,017,833, hereby incorporated by reference into this specification to form a part thereof, disclose hard-wired digital circuitry in the recorder of a cableless seismic digital recording system for vertically stacking seismic-trace data acquired by the recorder. Weinstein et al. U.S. Pat. No. 3,946,357 discloses a recorder including an adder circuit which sums newly acquired seismic-trace data received from a shift register with previously accumulated seismic-trace data temporarily stored in random access memory between consecutive initiations of the seismic source, and the accumulated sum is later recorded on a magnetic tape cartridge. Broding U.S. Pat. No. 4,017,833 discloses a recorder including a plurality of recirculating dynamic shift registers connected in cascade for storing the accumulated sum between consecutive initiations of the seismic source in order to economize power consumption.

The cableless seismic digital recording systems disclosed in Weinstein et al. U.S. Pat. No. 3,946,357 and Broding U.S. Pat. No. 4,017,833 are advantageous in instances when seismic-trace data is generated by high energy impulsive or low energy surface seismic sources. However, the ability to perform operations other than recording, with optional vertical stacking prior to recording, in the recorder of a cableless seismic digital recording system, such as processing the seismic-trace data for further improving the signal-to-noise ratio, is highly desirable. Unfortunately, it is well known that implementation of such features requires substantial modification of and addition to arithmetic and control logic circuits of hardwired digital circuitry such as included in the recorders of the respective cableless seismic digital recording systems disclosed in Weinstein et al. U.S. Pat. No. 3,946,357 and Broding U.S. Pat. No. 4,017,833. Implementation of such features necessitates redesign of the existing hard-wired digital circuitry or a separate component connectable to the existing hard-wired digital circuitry of the recorder. This invention is directed to an alternative approach to facilitate implementation of seismic-trace data processing capabilities in the recorder of a cableless seismic digital recording system.

SUMMARY OF THE INVENTION

In accordance with the invention, a microcomputer means is provided in the recorder of a cableless seismic digital recording system of the type disclosed in Broding et al. U.S. Pat. No. 3,806,864 for facilitating application of the cableless seismic digital recording system to seismic prospecting with any type of seismic source, either high energy impulsive seismic sources, such as dynamite, or low energy surface seismic sources, such as a vibrator used in vibroseis seismic prospecting. The microcomputer means preferably includes a microprocessor circuit having a program read only memory which stores sets of programmed instructions. Logic control signals required for recorder circuits (power up/down, sampling, tape transport on/off, etc.) are generated by specialized control routines. Seismic-trace data can be vertically stacked, and weighting values are preferably calculated and applied to seismic-trace data before vertical stacking, especially when a low energy surface seismic source is used, in accordance with data processing routines.

The preferred embodiment of the recorder of the invention includes means responsive to coded signals, preferably coded radio signals transmitted over a radio communications link, for activating the recorder by connecting the recorder to a supply of electrical power. The coded signals preferably comprise not only first coded signals, including an address, but also second coded signals, record-identification data, such as crew identification, date, and other record-header block information, as well as recording-parameter data, such as processing mode, exponent for calculating a weighting value in order to improve the signal-to-noise ratio of seismic-trace data in the operational mode using a low energy surface seismic source, whether or not seismic-trace data is to be normalized prior to recording, and other operating information. Additionally, the recorder includes means for successively sampling and digitizing seismic-trace signals produced by a seismic wave detector, such as a seismometer, or geophone, thereby forming seismic-trace data. The recorder also includes a microcomputer means, preferably a microprocessor circuit having a program read only memory with programmed instructions and an accessible random access memory for temporarily storing seismic-trace data, responsive to the second coded signals for selectably weighting, prior to vertically stacking, seismic-trace data. Preferably, the microcomputer means included in the recorder also normalizes seismic-trace data prior to being recorded. Furthermore, the recorder includes means for recording seismic-trace data, preferably on magnetic recording means such as a magnetic tape cartridge.

Coded radio signals interpreted by the microprocessor circuit cause the recorder to be placed in various operational modes. The recorder can be used for initiating the seismic source, such as dynamite, a vibrator, or any other type of source. Initiation of the seismic source is determined by a variable advance preferably entered into the recorder at the time of deployment which establishes the lead time for initiation of the seismic source before recording by the activated recorders commences. The recorder used for initiating a high energy impulsive seismic source calculates and records the "uphole" time, that is, the time delay between source initiation and detection of the direct seismic wave, and can be used for recording the source characteristic. The recorder used for initiating a low energy surface seismic source can be used for recording the source characteristic and in the case of a vibrator the pilot signal.

The recorder directly records seismic-trace data without any weighting or vertical stacking when a high energy impulsive seismic source is used. When a low energy surface seismic source is used, the recorder generally weights and vertically stacks seismic-trace data. Preferably, the weighted and vertically stacked seismic-trace data is normalized prior to recording. The recorder preferably includes a timer for de-activating the recorder if the time between successive initiations of the low energy surface seismic source reaches a predetermined time, such as ten minutes.

The recorder preferably includes a control panel for entering information and displaying various parameters, such as record flag and variable time-zero data associated with the recorder when used for seismic source initiation. Such features are implemented in the recorder of the cableless seismic digital recording system of the invention rather than in a separate component connectable to the recorder.

BRIEF DESCRIPTION OF THE DRAWINGS

The above and other features of this invention and a better understanding of the principles and details of the invention will be evident to those skilled in the art in view of the following description of the preferred embodiments given in conjunction with the accompanying drawings, in which:

FIG. 2, comprising

FIG. 3, comprising FIGS. 3A and 3B, is a time diagram of the coded signal transmissions applicable to operation of a preferred embodiment of the recorder of the invention;

DESCRIPTION OF THE PREFERRED EMBODIMENTS

Figure 1A:
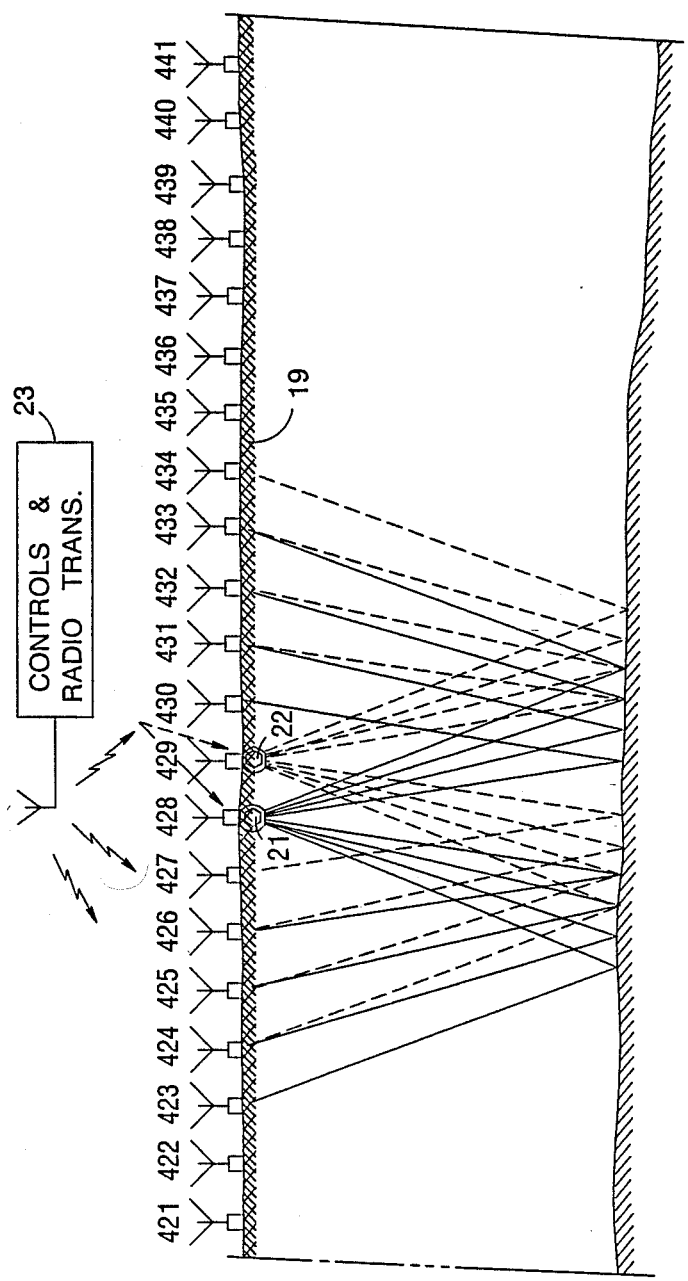
FIG. 1A is a diagrammatic cross-section of the earth which shows a field surveying operation using a cableless seismic digital recording system in accordance with the invention.

In accordance with the invention, each of a plurality of small, portable recorders is placed near and connected to a seismometer, for example, in a prospect area for recording one trace of a multiple seismic-trace record. Each recorder is preset to be responsive to and activated by coded signals transmitted over a communications link, preferably a radio communications link, from a control point to all of the recorders. Initially, in producing a seismic-trace record, the coded signals transmitted to all recorders contain coded signals corresponding to the preset indicia of only those recorders desired to be activated. Also, record-header block identification data and recording-parameter data are transmitted from the control point for operation of the activated recorders and to be recorded digitally on the magnetic tape cartridges of the activated recorders together with additional identifying and operating information peculiar to and entered in each recorder. Immediately following is transmitted a zero-time mark. The identifying and operating information and zero-time mark are recorded with the timed sequence of digitized seismic-trace data associated with the corresponding seismometer. At the end of the recording, the activated recorders automatically de-activate, reset themselves, and assume radio standby status in readiness for the next activation and digital recording sequence. Those recorders of the larger array which do not receive the particular coded signals necessary for them to be activated remain in an intermediate standby status without any movement of the recording tape.

As the recorders are utilized only as needed, each of the recorders normally has sufficient recording capacity for all of the seismic-trace records that are to be produced at a given location. When the location of the seismometer and associated recorder is to be changed, the recorded tape cn be removed, and a fresh supply of blank recording tape inserted.

The recorded tapes can then be transported to a central location for playback and storage of the seismic-trace data in any desired form and format of digital-computer storage and work tape. After the transcription has been performed, the field tape can be erased and returned to the prospect area for further use.

An appropriate control means is needed for controlling seismic prospecting utilizing the preferred embodiment of the recorder of the invention. Primarily, the function of the control means is initially to transmit coded signals to activate the selected recorders. Then the control means transmits record-header block identification data and recording-parameter data. Finally, the control means transmits a zero-time mark coincident with the initiation of seismic wave generation. For these purposes, the control means includes circuitry by means of which the appropriate control signals can be selected and transmitted as coded signals to the recorders. The transmission can be over an ordinary one-way radio communications link. As the transmitted coded signals occupy only a relatively limited frequency range, a high-quality, expensive transmission system is unnecessary. A preferred control means is more fully disclosed in a co-pending patent application of Bogey et al. (T-8547) filed on the same date as this application and assigned to a common assignee and hereby incorporated by reference into this specification to form a part thereof.

Sesmic-trace data acquisition by each of the recorders is by the coded signals transmitted over the one-way radio communications link with a single transmitter at the control point, or base station. An almost unlimited number of recorders can be remotely deployed simultaneously at any location in the prospect area within the range of the transmitter, the range being about an eight-mile radius of the control point in the preferred embodiment.

Figure 1B:
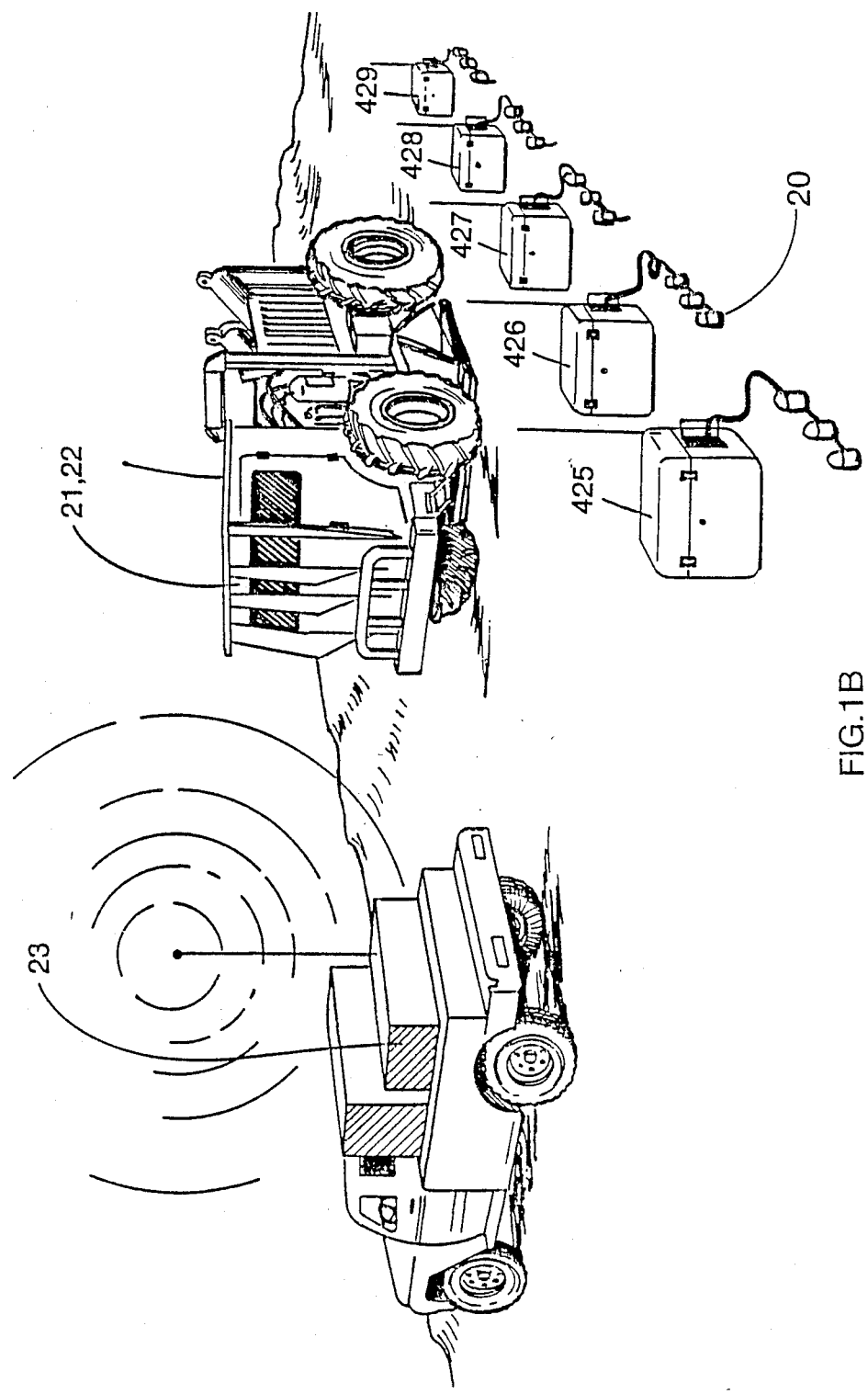
FIG. 1B illustrates deployment of the cableless seismic digital recording system shown in FIG. 1A.

With reference now to the drawings, FIG. 1A shows in diagrammatic fashion an earth cross-section with an embodiment of the recorder of the invention positioned for recording seismic-trace data. Spaced at intervals along a profile survey line extending along the earth's surface 19 are individual recorders 421–441, each comprising a radio receiver circuit, including an antenna, and a small magnetic tape device, preferably of the cartridge type. Each of the recorders 421–441 is connected to at least one seismometer and preferably to a group of interconnected seismometers 20 producing a single seismic-trace signal in the manner customary in seismic prospecting as shown in FIG. 1B.

At or near the positions occupied by the recorders 428 and 429 in FIG. 1A are respectively shown diagrammatically a first seismic source 21 and a second seismic source 22. At any convenient control point, there is a control means 23, including control circuits and a radio transmitter, which controls and coordinates the operation of the recorders 421–441. The various seismometers or seismometer groups 20 are initially deployed along the profile survey line, and each of the seismometers or seismometer groups is then electrically connected to the amplifier input terminal of the associated one of the recorders 421–441 as more clearly shown in FIG. 1B.

For the purposes of illustration, the reference numbers 421–441 can be considered to function also as identification numbers for the locations of the seismometers or seismometer groups 20. As each seismometer or seismometer group 20 and associated one of the recorders 421–441 are placed at a location, that location number, or address, is entered into the recorder to become both the coded signal which will subsequently activate the recorder, as well as the recorder position identification to be supplied by the recorder and recorded as part of the record-header block identification data. For example, when the recorder 425 and corresponding seismometer or seismometer group 20 are placed in position and connected together, the numerals "4," "2," and "5" are manually set on address code dials, such as three digital pushbutton switches, included in the recorder. The binary coded decimal (BCD) equivalent of 425, namely, 0100 0010 0101, becomes the coded address signal that is to be transmitted by the control means 23 whenever the recorder 425 is to be activated for recording seismic-trace data.

Specifically, in preparing to record from seismic source point 21 in FIG. 1A, for example, the control means 23 transmits, over the radio communications link to all of the recorders 421–441, coded address signals so chosen that only the recorders 423–426 and 430–433, for example, are activated for recording, the remainder of the recorders remaining quiescent. Coded signals are also transmitted which include record-header identification data identifying location 428 as the seismic source point, for example, as well as providing other identifying information, such as crew identification, date, time, and the like. Included in the transmission by the control means 23 is also recording-parameter data indicating the operational mode for the recorders 423–426 and 430–433, for example, as well as providing other operating information. The transmitted identifying and operating information is to be recorded by all of the eight operating recorders 423–426 and 430–433, together with additional identifying and operating information entered into the recorders at the time that they are deployed. Furthermore, the coded signals include a zero-time mark indicating the initiation of generation of seismic waves by the seismic source 21. During the transmission, all of the recorder 423–426 and 430–433 synchronize to the zero-time mark. Therefore, sampling of the seismic-trace signals detected by the seismometers or seismometer groups 20 in FIG. 1B connected to the operating recorders is in synchronization. At the end of a preset recording interval, the recorders 423–426 and 430–433 in FIG. 1A return to a standby status in readiness for the next recording.

For recording from seismic source point 22, the eight selected recorders to be activated are shifted one profile position to the right in FIG. 1A from those used for recording from seismic source point 21. The control means 23 accordingly transmits modified coded address signals to which only the recorders 424–427 and 431–434 respond by activating. The control means 23 also transmits appropriate modified record-header block identification data and recording-parameter data, immediately followed by a zero-time mark indicating the initiation of generation of seismic waves at the seismic source 22. The recorders 424–427 and 431–434 also return to standby status at the end of the recording period.

In the above manner, seismic waves are successively generated at locations 430, 431, 432, and so on, until all desired seismic source and recording points along the profile survey line have been occupied. The showing of only eight recorders in operation is to simplify the example and avoid confusion in the drawings. In commercial embodiments, the number of active recorders for each seismic-trace record is typically 96, 144, or more, with seismometer or seismometer group and associated recorder spacings subject to exploration conditions. Nevertheless, the principle of operation is the same as described above.

Figure 2A:
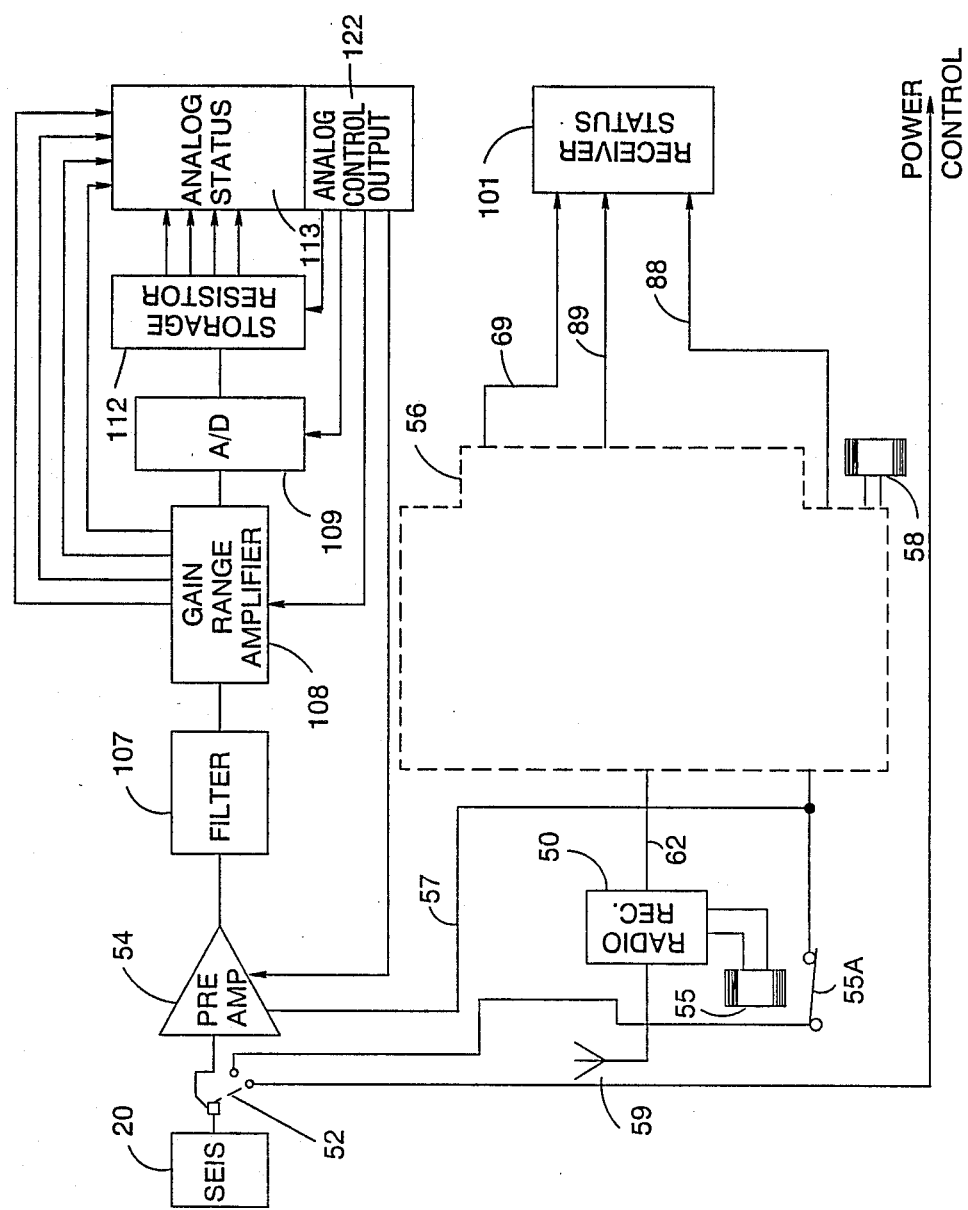
FIGS. 2A through 2C, is a block diagram of a preferred embodiment of the electronic circuitry which comprises the recorder of the invention.
Figure 2B:
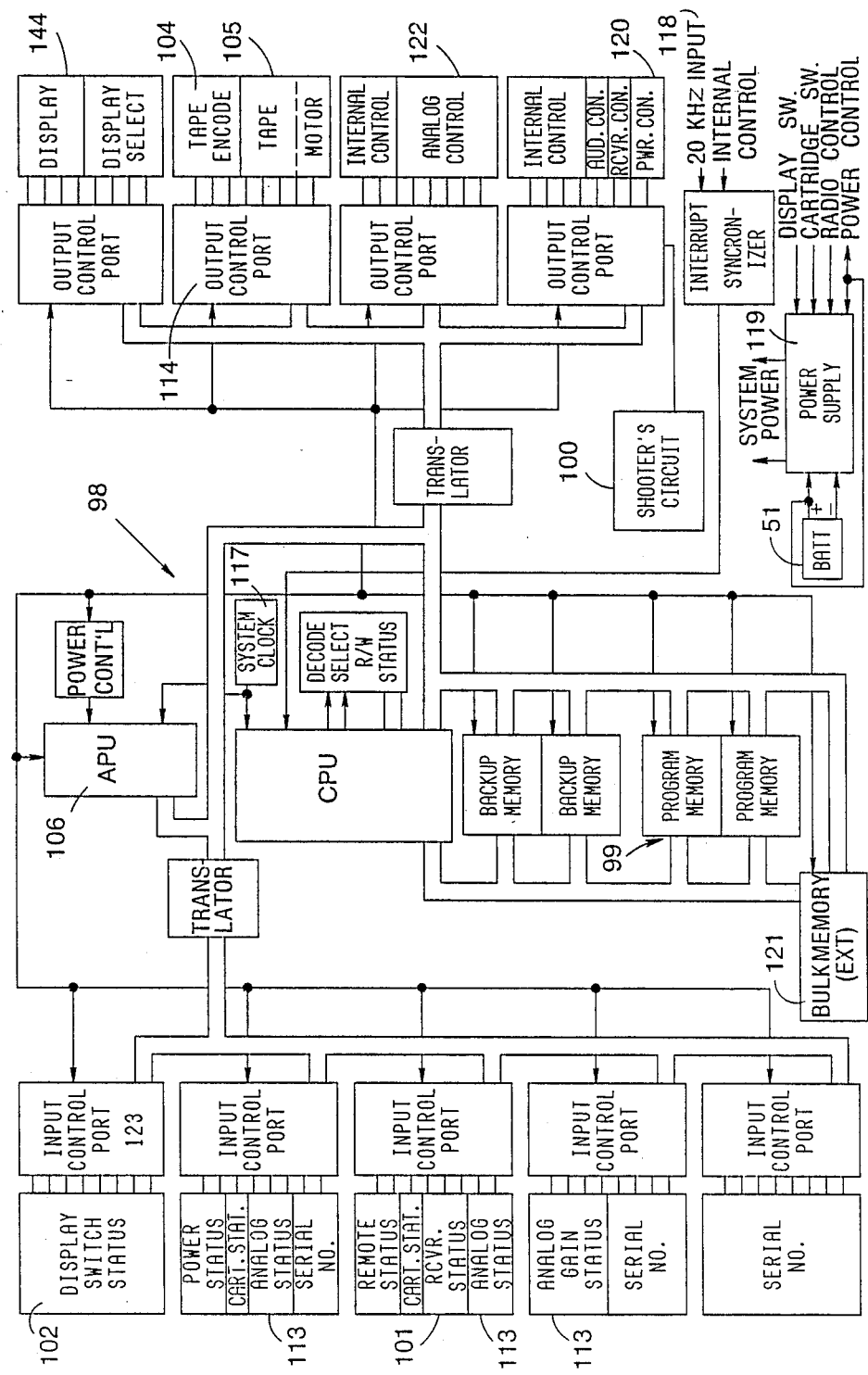
Figure 2C:
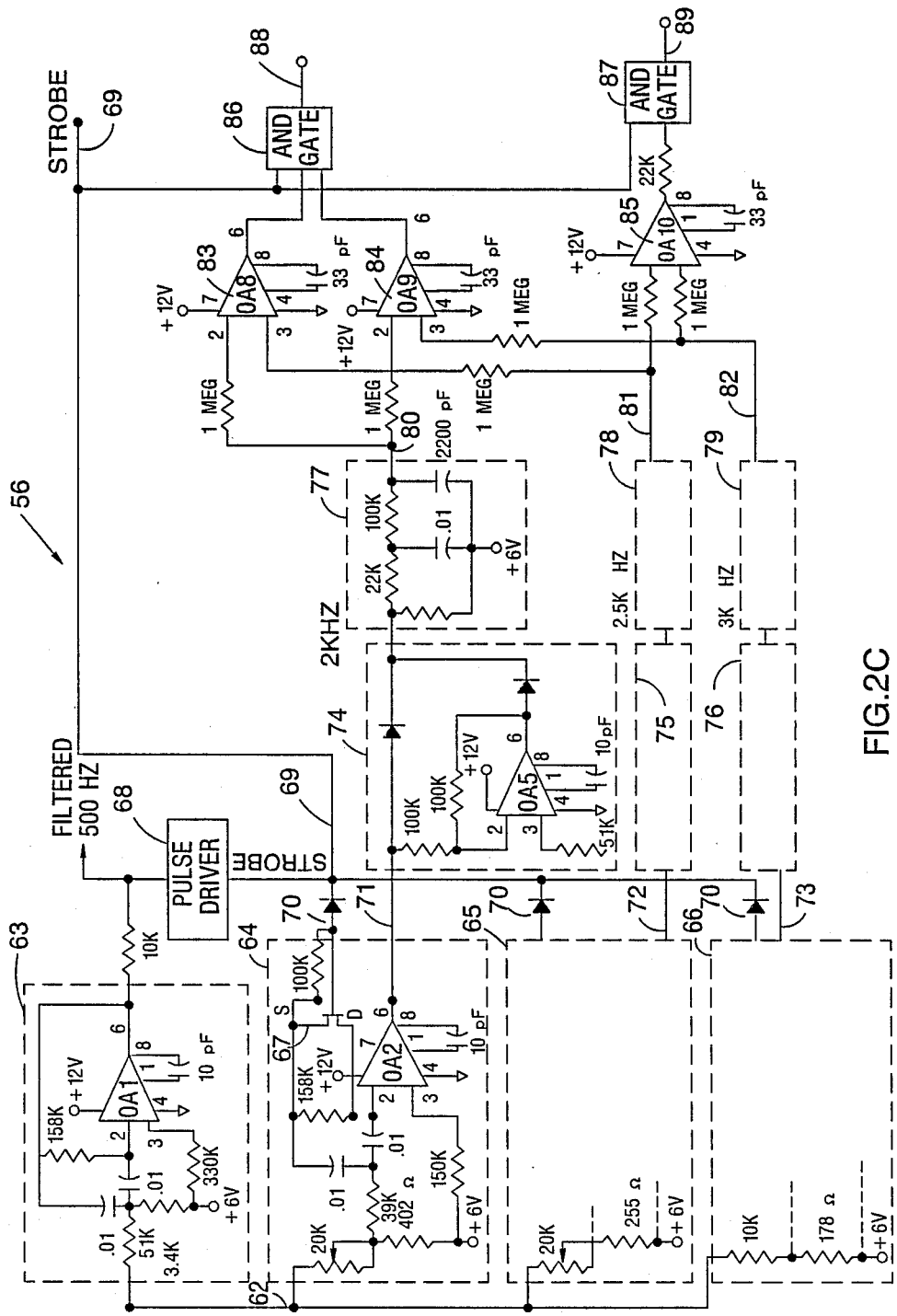

FIG. 2, comprising FIGS. 2A through 2C, shows in block diagram form the circuitry of each of the recorders 421–441 in FIG. 1 for recording seismic-trace data. In general, the upper portion of FIG. 2A shows the seismic-trace data acquisition circuits, and the bottom portion or FIG. 2A together with FIG. 2C shows the circuits which decode the transmission from the control means 23 in FIG. 1. FIG. 2B shows the control and seismic-trace data processing circuitry in the form of a microprocessor circuit.

The preferred control means 23 in FIG. 1 employs coherent frequency-shift keying, in which several different audio frequencies, bearing certain relations to each other, are utilized, so that maximum range is assured for accurately activating the selected recorders and transmitting needed identifying and operating information for producing each recording. The control means 23 transmits coded signals for the selective activation of certain recorders remotely deployed in the prospect area, that is, the addresses of the recorders which are to be activated for a particular recording; identifying and operating information concerning the next recording to be produced; and a zero-time mark for synchronizing the activated recorders, so that sampling of the seismic-trace signal to be recorded is synchronized. Such information is needed for obtaining useful seismic-trace data.

Figure 3A:
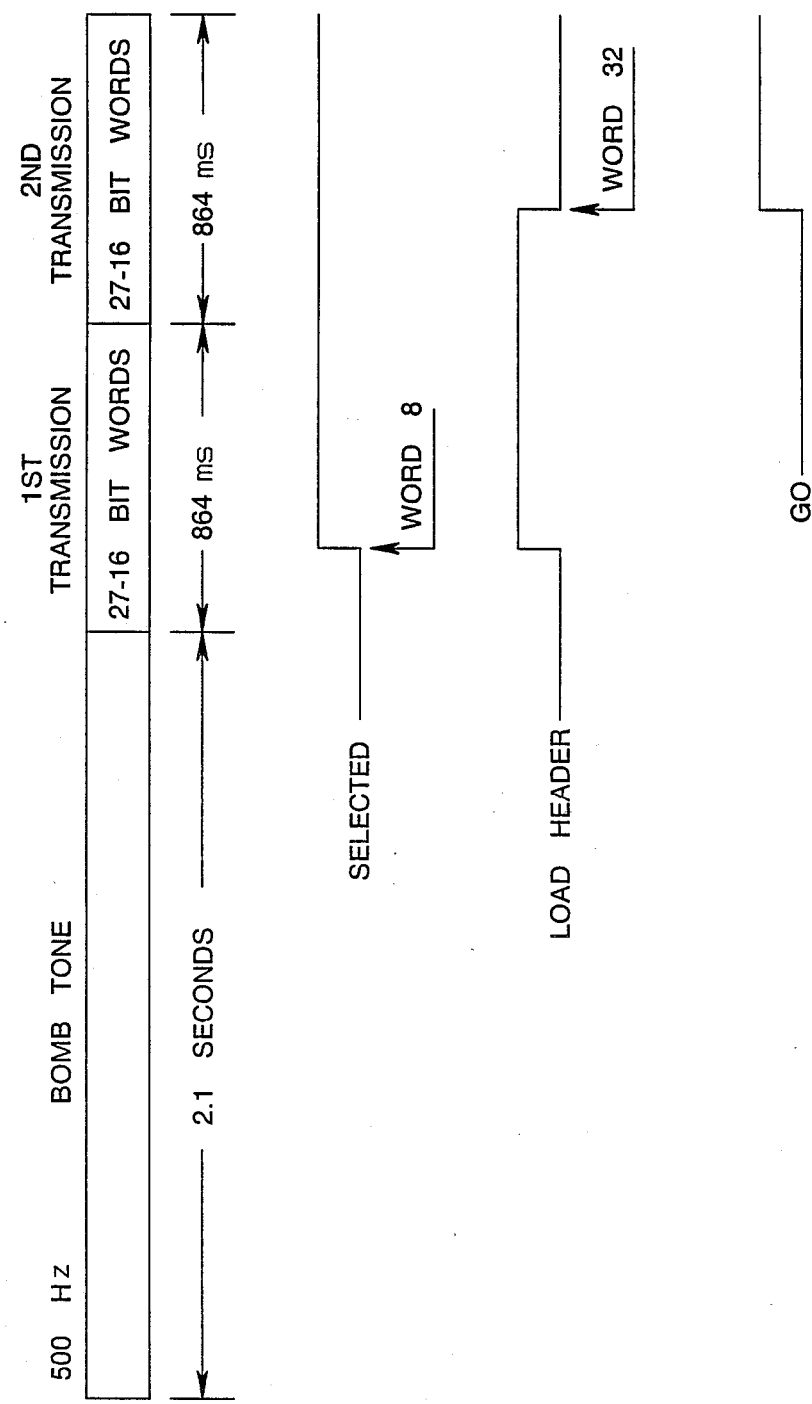

Initially, the control means 23 transmits a carrier signal (BOMB TONE) at a frequency of 500 hertz as shown in FIG. 3A for a period of time sufficient for the recorders 421–441 in FIG. 1 to assume standby status, for example, 2.1 seconds. The control means 23 next transmits a sequence of coded radio signals in the form of 16-bit binary coded words as shown in FIG. 3B by means of frequency-shift keying. The binary coded words, for example, are comprised of logical zeros in the form of 2.5-kilohertz (kHz) tones and logical ones in the form of 3-kHz tones.

As shown in FIG. 3B, the initial coded signal is a control tone at a frequency of 2 kHz for the purpose of signaling the recorders 421–441 in FIG. 1 that an operation is about to commence. The control means 23 next transmits four coded signals as shown in FIG. 3B, which represent the addresses of the recorders 421–441 in FIG. 1 which are selected to be activated. The recorders 421–441 which become activated are those with addresses from FIRST BEGIN STATION to FIRST END STATION and from SECOND BEGIN STATION to SECOND END STATION, inclusive, as shown in FIG. 3B.

The control means 23 in FIG. 1 then transmits a coded signal with regard to the SHOT POINT CALL as shown in FIG. 3B, which is determinative of the seismic source "shooter's box", that is, which among the recorders 421–441 in FIG. 1 will initiate the seismic source, after which is transmitted a coded signal including a bit indicative of first transmission or second transmission, a bit indicative of an actual seismic prospecting operation or merely a test operation, six binary zero bits for completing a word, and an 8-bit cyclic redundancy check (CRC) code as shown in FIG. 3B. The above sequence requires approximately 231 milliseconds.

The identical sequence is then repeated during the following 231 milliseconds. The purpose of repeating the sequence is to provide redundancy in order to enhance the reliability of operation of the selected recorders.

After the addresses and other coded signals through the CRC code are repeated, the control means 23 in FIG. 1 transmits the record-header block identification data and recording-parameter data with regard to the seismic prospecting operation. The record-header block identification data as shown in FIG. 3B includes a coded signal which represents the FILE NUMBER after which is transmitted a SOURCE location identification followed by a SOURCE FRACTION if the SOURCE location is actually offset from a reference survey marker.

The control means 23 in FIG. 1 next transmits recording-parameter data comprising a SPARE as shown in FIG. 3B, the SPARE being determinative of the operational mode, as well as the selected weighting factor to be used if the seismic-trace data is to be vertically stacked. The control means 23 in FIG. 1 can then transmit a coded signal determinative of the ADVANCE TIME as shown FIG. 3B, which is the time delay between the actual initiation of the seismic source and the time that the activated recorders are to begin acquisition of the resultant seismic-trace data, although in the preferred embodiment the ADVANCE TIME is entered into the recorders 421–441 in FIG. 1 at the time of their deployment as will be described in more detail later. In the event that an ADVANCE TIME is transmitted to or, preferably, entered into the recorders 421–441, the seismic source is initiated prior to beginning the recording process.

Thereafter, the control means 23 transmits additional record-header block identification data as shown in FIG. 3B including: ID1 through ID4 whereby any desired information is transmitted by the control means to the activated recorders to be recorded on the magnetic tape cartridge; a profile survey LINE identification; MONTH, DAY, and YEAR identification; and AREA1 through AREA3 indicative of the prospect area. The control means 23 in FIG. 1 then transmits the coded signal including a bit indicative of first transmission or second transmission, a bit indicative of an actual seismic prospecting operation or merely a test operation, six zero bits for completing a word, and an 8-bit CRC code as shown in FIG. 3B. Finally, the control means 23 in FIG. 1 transmits a coded signal representative of END OF HEADER FLAG as shown in FIG. 3B. The record-header block identification data and recording-parameter data transmission requires 402 milliseconds.

The entire sequence described above is then repeated during the following 864 milliseconds as shown in FIG. 3A. The only difference in the transmitted coded signals is that the transmission bit changes to reflect second transmission rather than first transmission. The END OF HEADER FLAG contained in the second transmission comprises the zero-time mark. The conclusion of the second transmission is known as time zero and is time for commencement of recording; that is, it is the instant at which the seismic wave to be investigated is initiated and sent into the earth.

As will be explained in more detail later, additional record-header block identification data and recording-parameter data are entered into the recorders 421–441 in FIG. 1 at the time that they are deployed. The STATION location identification, for example, is included in record-header block identification data entered into each of the recorders 421–441 at the time of deployment. The ADVANCE TIME mentioned above, an adjustable RECORD LENGTH, which is determinative of the actual period of recording, and other operating information, are also entered into the recorders 421–441 at the time of deployment. In the operational mode involving a high energy impulsive seismic source, the record-header block identification data and recording-parameter data are recorded on the magnetic tape cartridge after the second transmission is completed, and in the operational mode involving a low energy surface seismic source, the record-header block identification data and recording-parameter data are recorded on the magnetic tape cartridge at the time that seismic-trace data is recorded, as will be described in more detail later.

Each of the recorders 421-441 in FIG. 1 includes a radio receiver 50 as shown in FIG. 2A. The radio receiver 50 is energized by a battery 51 as shown in FIG. 2B. As shown in FIG. 2A, an interconnection indicated at 52 assures energization of the radio receiver 50 by connection to the battery 51 in FIG. 2B when the seismometer or seismometer group 20 is plugged into the input of a preamplifier 54 as shown in FIG. 2A.

The radio receiver 50 with its associated receiving antenna 59 is tuned to the carrier signal frequency of the radio communications link between the recorders 421-441 and the control means 23 in FIG. 1. Included in the circuit of the radio receiver 50 in FIG. 2A is a squelch relay 55 which is normally de-energized in the absence of a transmitted and received carrier signal from the control means 23 in FIG. 1. Upon receipt of the carrier signal from the control means 23, however, the relay 55 in FIG. 2A is energized and closes contacts 55A so that the battery 51 in FIG. 2B is connected to a decoder circuit, generally indicated by the numeral 56, and over a line 57 to the preamplifier 54 as shown in FIG. 2A. The demodulated audio portion of the received coded signal is found on a line 62 which connects the radio receiver 50 to the decoder circuit 56.

As shown in detail in FIG. 2C, the decoder circuit 56 includes a parallel combination of tuned amplifiers, each of which comprises a filter. The circuit for the 500-hertz filter is included in the rectangle 63.

The three rectangles 64, 65, and 66 can be referred to as integrate and dump filters since they not only contain a tuned amplifier, but additionally a field effect transistor (FET) switch which quenches the filter upon the receipt of a strobe pulse from a pulse driver 68 which acts on the filtered 500-hertz signal from the filter circuit 63. Included in the pulse driver 68 is first an over-driven amplifier, which produces a square wave equivalent to the 500-hertz sine wave, and a derivative circuit for producing a sharp, short pulse each time that the square wave reverses polarity. The pulse driver 68 produces a very short duration pulse each two milliseconds. By the use of a diode, only one polarity pulse is transmitted to a strobe line 69. The signal from the pulse driver 68 on the strobe line 69 (the strobe pulse) is coupled to the integrate and dump filter FET switches through steering diodes (also called isolators) 70. This assures that each FET switch is activated every two milliseconds during reception of the coded signal by the radio receiver 50 in FIG. 2A.

The signals on lines 71, 72, and 73 from the respective integrate and dump filters 64-66 in FIG. 2C differ widely in their amplitudes at the dump instant. The amplitude differencees of the signals on the lines 71-73 from the respective integrate and dump filters 64-66 are further emphasized by the use of identical level detectors 74, 75, and 76. The level detectors 74-76 act both to rectify the signals and to produce non-linear amplitude signals which increase as the amplitude of the signals on the respective lines 71-73 increase. For example, the signal from the level detector 74 increases approximately as the square of the amplitude of the envelope of the signal on the line 71. The signals from the respective level detectors 74-76 in turn are individually passed through identical low-pass filters 77, 78, and 79.

The difference between the signal of the 2-kHz channel on a line 80 and the 2.5-kHz channel on a line 81, after passing through isolating resistors, is amplified by an amplifier 83. Similarly, the difference between the signal on the 2-kHz channel, the line 80, and that on the 3-kHz channel, a line 82, is amplified by an amplifier 84. The signals from the amplifiers 83 and 84 are passed into an AND gate 86, the third input to which is the strobe pulse on the strobe line 69. Accordingly, there will be a signal from the AND gate 86 only when there is a signal on the line 80 (2-kHz channel) and none on both lines 81 and 82 from the 2.5- and 3-kHz channels, respectively.

Similarly, an amplifier 85 amplifies the difference between the signals on the lines 81 and 82, that is, the difference between the response of the 2.5-kHz and 3-kHz channels. The signals on the lines 81 and 82, that is, passing through a buffer resistor, is passed into an AND gate 87, to which the other input is the strobe pulse on the strobe line 69.

The signals from the two AND gates 86 and 87 can be non-zero only at the instant of the strobe pulse on the strobe line 69, so that signals are obtained essentially at the instant of quenching of the signal in the filters 64-66. Therefore, the signals from the AND gates 86 and 87 represent the maximum difference in signals between different frequency channels, which is the effect desired to be obtained with the coherent frequency-shift signaling system employed.

The signals from the AND gates 86 and 87 are employed for the control, addressing, and identifying and operating information needed by the recorder. In essence, the signal on a line 88 from the AND gate 86 represents that there is a 2-kHz signal and no 2.5- or 3-kHz signal. The signal on the line 88 is the control tone signal. On the other hand, the signal on a line 89 from the AND gate 87 represents the signals on the 2.5- and 3-kHz channels, that is, the logical zeros and ones of the various addresses, record-header block identification data, and recording-parameter data.

With reference now to FIG. 2B, the microcomputer circuit included in each of the recorders 421-441 in FIG. 1 in accordance with the invention is generally indicated by the numeral 98. The coded signals which represent the control, addressing, and identifying and operating information needed by each of the recorders 421-441 initiate an operation or sequence of operations from predetermined sets of programmed instructions stored in a read only memory (ROM) or program memory 99 as shown in FIG. 2B.

The various coded signals transmitted by the control means 23 in FIG. 1 to the radio receiver 50 in FIG. 2A are passed into the decoder circuit 56. The decoder circuit 56 provides strobe pulses at two-millisecond intervals corresponding to the 500-hertz transmission from the control means 23 in FIG. 1. The coded address signals received from the control means 23 are routed from the decoder circuit 56 by a receiver status circuit 101 as shown in FIG. 2A and again in FIG. 2B through an input control port 123 to the microprocessor circuit 98, which is programmed to be responsive only if one particular coded address signal is received. The microprocessor circuit 98 will respond to the particular coded address signal associated with the position occupied by the seismoneter or seismoneter group 20 in FIG. 1B, which address is typically preprogrammed at the time that the seismometer or seismometer group is placed in position, and the position number is transferred from control panel switches 102 to the microprocessor circuit memory as shown in FIG. 2B.

If and when the particular coded address signal is received, the microprocessor circuit 98 energizes a power control circuit 120 through an output control port 114. The power control circuit 120 energizes a power supply circuit 119 which is connected to the remainder of the recorder circuits. If the coded address signals transmitted by the control means 23 in FIG. 1 do not include an address that matches the address code entered into the microprocessor circuit memory when the recorder was deployed, the power supply circuit 119 in FIG. 2B remains de-energized, and no power is connected to the main recorder and magnetic tape cartridge transport circuits.

Assuming that a coded address signal is recived that matches the address code entered into the microprocessor circuit memory, the receiver status circuit 101 in FIG. 2A routes the record-header block identification data and recording-parameter data transmitted by the control means 23 in FIG. 1 into the microprocessor circuit memory for temporary storage. Under control of programmed instructions, 500-hertz pulses at two-millisecond intervals are generated by the microprocessor circuit 98 in FIG. 2B. Therefore, the record-header block identification data and recording-parameter data from the receiver status circuit 101 are placed in storage in the microprocessor circuit memory at the relatively slow rate of 500 bits per second or two milliseconds per bit, while simultaneously up to three words of additional identifying and operating information characterizing the recorder and preset on the control panel switches 102 are placed in storage in the microprocessor circuit memory.

The microprocessor circuit 98 recognizes the END OF HEADER FLAG the completion of the completion of the record-header block identification data and recording-parameter data transmission by the control means 23 in FIG. 1. When the seismic source location (SHOT POINT CALL in FIG. 3B) transmitted by the control means 23 in FIG. 1 corresponds to the preprogrammed address of the recorder, the microprocessor circuit 98 in FIG. 2B energizes a shooter's circuit 100 through the output control port 114. When the END OF HEADER FLAG has been detected, the microprocessor circuit 98 is also conditioned to sequence the identifying and operating information together with the seismic-trace data from the seismometer or seismometer group 20 in FIG. 2A through the output control port 114 to a pulse width encoder 104 and in turn to a magnetic tape cartridge recorder 105 as shown in FIG. 2B.

Microprocessor, memory, and power supply circuits are preferably on three printed circuit boards. The hardware under the control of the programmed instructions contained in the hardware not only performs the logic control functions which are generally required for seismic prospecting, but also can perform several weighting and vertical stacking (summing) and storing functions, which are highly advantageous during seismic prospecting with a low energy surface seismic source.

In addition to the microprocessor circuit 98 included in each of the recorders 421–441 in FIG. 1, whose programmed instructions reside in the program memory 99 in FIG. 2B, each recorder preferably includes an arithmetic processing unit 106, which performs weighting and vertical stacking (summing) under control of the microprocessor circuit, and a random access memory (RAM) or bulk memory 121 for temporarily storing the weighted and vertically stacked seismic-trace data between initiations during seismic prospecting with a low energy surface seismic source. Weighted and vertically stacked seismic-trace data accumulated in the bulk memory 121 is reproducibly recorded by the magnetic tape cartridge recorder 105 after a sequence of initiations. The bulk memory 121 can be a 32K-byte memory (20-second record lengths). A 64K-byte bulk memory 121 increases the record length capability to 36 seconds.

During the operation of the activated recorders, seismic-trace signals from the seismometer or seismometer group 20 in FIG. 2A are amplified by the preamplifier 54 and filtered, if desired, by a filter 107 and then further amplified by a gain-ranging multi-stage amplifier 108. The amplified analog seismic-trace signals from the amplifier 108 are converted on command to digital format by an analog-to-digital converter circuit 109 and, along with the instantaneous value of gain of the amplifier 108, are then transferred to an 8-bit storage register 112. Transfer of the digitized seismic-trace signals from the analog-to-digital converter circuit 109 to the storage register 112 is based on a 500-hertz frequency generated by the microprocessor circuit 98 in FIG. 2B and passed through the output control port 114 to an analog control circuit 122 as shown in FIG. 2B and again in FIG. 2A. Ranging by the amplifier 108 occurs at a relatively high 55-kHz frequency generated by the microprocessor circuit 98 in FIG. 2B and passed through the output control port 114 to the analog control circuit 122. The stored bits are clocked out of the storage register 112 in FIG. 2A in sequence through an analog status circuit 113 as shown in FIG. 2A and again in FIG. 2B by the microprocessor circuit 98. Clocking out of the stored bits from the storage register 112 in FIG. 2A also occurs at the 55-kHz frequency. The microprocessor circuit 98 in FIG. 2B then can process and/or route the seismic-trace data through the output control port 114 to the pulse width encoder 104, which transforms the data into a form suitable for recording as serial bits by the magnetic tape cartridge recorder 105. The microprocessor circuit 98 can also route information through the output control port 114 to a display 144.

Timing for the microprocessor circuit 98 is under the control of a crystal oscillator clock 117 which operates at a frequency of 3 megahertz (MHz). A lower frequency oscillator 118 at 20 kHz generates interrupts for the microprocessor circuit 98. A sample interval of two milliseconds, which is in present widespread use in seismic prospecting, based on and synchronized with the 20-kHz frequency is preferably used.

Synchronization among all of the activated recorders operating for producing the traces of a given multiple seismic-trace record is assured during transmission of the record-header block identification data and recording-parameter data by the control means 23 in FIG. 1. Specifically, the microprocessor circuit 98 in FIG. 2B of each of the activated recorders resets the oscillator 118 when the END OF HEADER FLAG is received during the second transmission of the record-header identification data and recording-parameter data. At the conclusion of recording a seismic-trace record, the power supply circuit 119 is reset by the microprocessor circuit 98 through the power control circuit 120 for deactivating the recorder.

Figure 4:
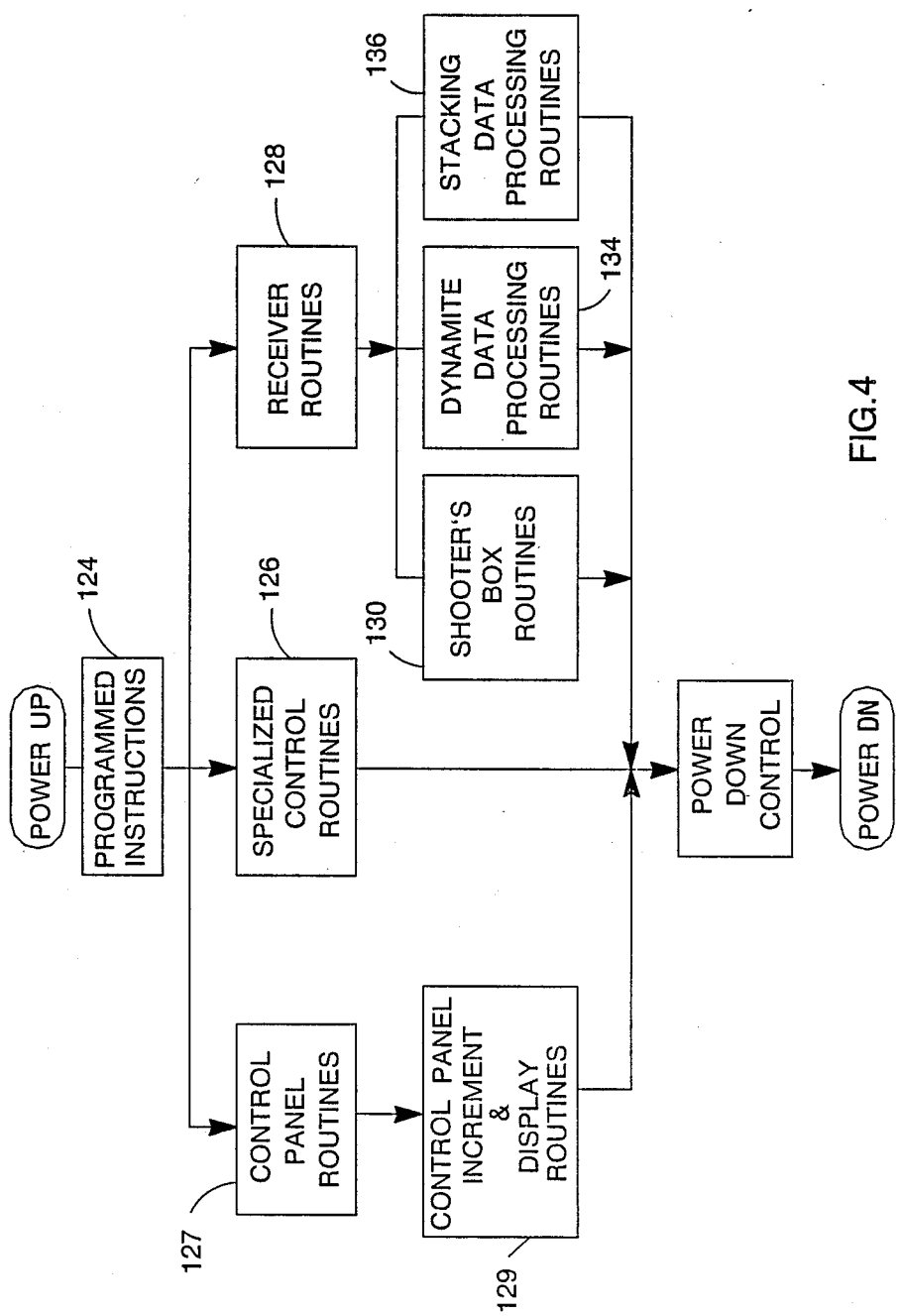
FIG. 4 illustrates the operational modes of a preferred embodiment of the recorder of the invention.

FIG. 4 illustrates the operational modes included in sets of programmed instructions 124 stored in the program memory 99 in FIG. 2B of each of the recorders 421-441 in FIG. 1. As shown in FIG. 4, logic control signals needed for recorder circuits (power up/down, sampling, tape transport on/off, etc.) are generated by specialized control routines 126. Control panel routines 127 enter identifying and operating information set by means of the control panel switches 102 in FIG. 2B and cooperate with control panel increment and display routines 129 for driving the control panel displays as will be described in more detail later. Receiver routines 128 interpret the coded radio signals and cause each of the activated recorders to be placed in various of the following operational modes.

In accordance with shooter's box routines 130, a recorder can be used for initiating the seismic source. When the seismic source point (SHOT POINT CALL in FIG. 3B) transmitted by the control means 23 in FIG. 1 corresponds to the preprogrammed address of the recorder, the shooter's circuit 100 in FIG. 2B will be energized at a designated source initiation time. The shooter's circuit 100 can be used to detonate a dynamite charge or initiate a sweep generator, for example. The initiation time is determined by a variable advance which can be entered into the recorders 421-441 in FIG. 1 by means of the control panel switches 102 in FIG. 2B as will be described in more detail later. Multiple shooter's boxes can be selected simultaneously for initiating multiple shot seismic sources. The control means 23 in FIG. 1 can initiate simultaneous selection of multiple shooter's boxes by transmitting a "shooter's call" of 9900 to 9999 in the instance where each of the recorders selected as a shooter's box has a preprogrammed address within these limits. Consequently, as many as 100 unique shooter's boxes can be simultaneously selected.

Seismic-trace signals representative of the seismic source can be recorded by the same recorder which initiates the seismic source. Uphole signals indicative of the initial seismic wave from a high energy impulsive seismic source are detected and recorded, and the "uphole" time, that is, the time delay between initiation and detection of the direct seismic wave, can be calculated. The uphole time is also recorded in the header of the following record and can be displayed by the display 144. The first or last initiation of a sequence of low energy surface seismic source initiations can be selectively recorded. Pilot signals from multiple vibrator initiations can be recorded for similarity analysis.

With reference to FIG. 4, dynamite data processing routines 134 are used with high energy impulsive seismic sources. In accordance with the dynamite data processing routines 134, the activated recorders merely record the seismic-trace data. The seismic data is not weighted or vertically stacked in the dynamite data processing mode. After recording is complete, the activated recorders are de-activated. Gain-ranging amplification excursions can be displayed as will be described later.

The seismic-trace data weighting and vertical stacking method which forms the subject matter of a copending patent application of Warmack (T-8577) or the subject matter of a co-pending patent application of Smith et al. (T-8444), filed on the same date as this application and assigned to a common assignee and hereby incorporated by reference into this specification to form a part thereof, is preferably included in the sets of programmed instructions stored in the program memory 99 in FIG. 2B. In accordance with either method, in response to the initial initiation of a low energy surface seismic source, the seismic-trace signal is sampled, weighted, and stored in the bulk memory 121. For subsequent initiations of the low energy surface seismic source, the stored seismictrace data from the previous initiation is vertically stacked, that is, summed, with the weighted seismic-trace data representative of the subsequent initiations. The procedure is successively repeated until the weighted seismic-trace data representative of a selected number of initiations of the low energy surface seismic source has been vertically stacked. The accumulated seismic-trace data can then be normalized prior to being recorded.

With reference again to FIG. 4, stacking data processing routines 136 are used with low energy surface seismic sources. In accordance with the stacking data processing routines 136, several weighting and recording modes are available.

The weighting modes available in the activated recorders are selectable by coded radio signal. They preferably include: IPW(0), exponent zero, unweighted floating-point sum; IPW(1), exponent one, inverse average absolute value weighting; IPW(2), exponent two, inverse average square value weighting; and IPW(4), exponent four, inverse average fourth-power weighting.

Preferably, weighting values for each seismictrace signal sample are obtained by linearly interpolating between the weighting values computed over predetermined portions of the traces, or windows. Computation and application of the weighting values along with vertical stacking, or summation, is preferably accomplished in a 4-byte format. Each set of seismic-trace data for a sequence of initiations is weighted and summed in the bulk memory 121 in FIG. 2B. After the last set of weighted seismic-trace data in a sequence is vertically stacked, the cumulative sum stored in the bulk memory 121 is preferably normalized and then recorded by the magnetic tape cartridge recorder 105. After normalization, the seismictrace data is preferably converted back to a 2-byte format prior to being recorded.

Recording in the stacking data processing mode is either "immediate," that is, at the end of the current sequence of operations, or "delayed," that is, at the beginning of the next sequence of operations (when a coded radio signal is transmitted to acquire the first set of seismic-trace data in the subsequent sequence). Following an "immediate" recording, the recorders are de-activated; if a "delayed" recording is made, the recorders remain activated between initiations for the purpose of preserving the weighted and vertically stacked seismic-trace data in the bulk memory 121. Gain-ranging amplification excursions can be displayed after each seismic-trace signal acquisition cycle as will be described later.

In the stacking data processing mode, the activated recorders remain activated between initiations so as to retain the accumulated seismic-trace data in the bulk memory 121. If, however, the time between any two initiations in a sequence reaches ten minutes, for example, a timer in each of the recorders causes the recorder to be de-activated.

Considered in more detail, when recorders are activated in the stacking data processing mode, the ten-minute lock-up with power on, thereby unnecessarily consuming battery power. Therefore, the total time between initiations cannot reach ten minutes, or the activated recorders are automatically de-activated, and, consequently, any weighted and vertically stacked seismic-trace data previously acquired is lost. Should conditions dictate that the time allowance be exceeded, a TEST CALL transmitted by the control means 23 in FIG. 1 to any recorder will reset the timers in all activated recorders. Furthermore, if such a TEST CALL is transmitted, an aural alarm in each of the activated recorders sounds three times before the recorder is de-activated.

FIG. 5 shows a control panel 138 included in each of the recorders 421-441 in FIG. 1. The control panel switches 102 included in the control panel 138 in FIG. 5 are under control of the control panel routines 127 in FIG. 4. The control panel switches 102 include six display select switches, generally indicated by the numeral 140 in FIG. 5, which are preferably pushbutton switches that can be used to perform "alternate" functions in a manner similar to the pushbuttons included in hand-held calculators.

Figure 5A:
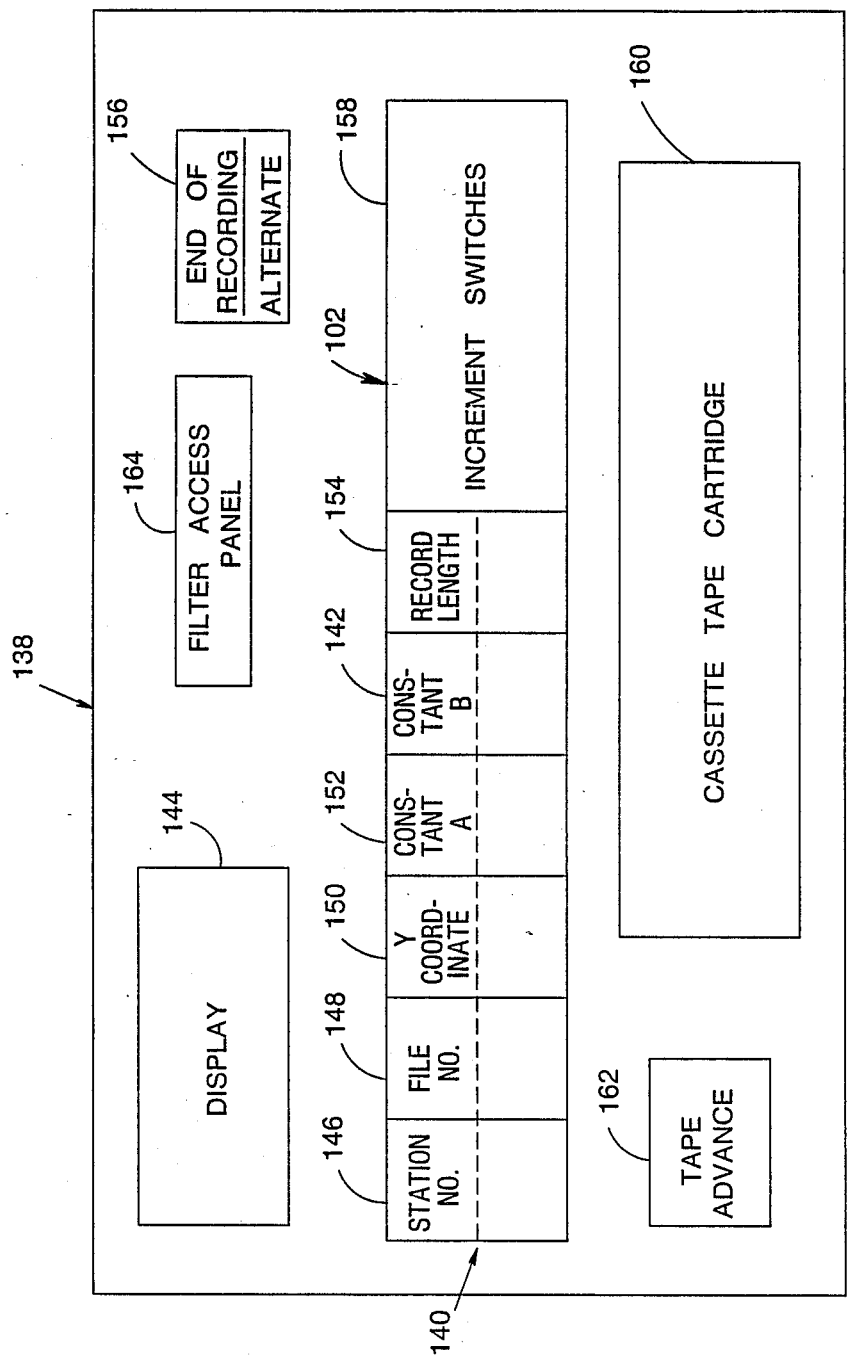
FIG. 5A shows the control panel of a preferred embodiment of the recorder of the invention.

The primary functions of the six display select switches 140 are shown in FIG. 5A. Actuation of CONSTANT B display select switch 142 causes the software program revision level of the recorder to be displayed by the display 144. A STATION NO. display select switch 146 causes the location of the recorder to be displayed by the display 144 when actuated. The number of files, that is, the number of sets of seismic-trace data, recorded by the magnetic tape cartridge recorder 105 in FIG. 2B can be displayed by the display 144 in FIG. 5 upon actuation of a FILE NO. display select switch 148. Actuation of a Y COORDINATE display select switch 150 or a CONSTANT A display select switch 152 causes identifying data selectively entered into the recorder to be displayed by the display 144. A RECORD LENGTH display select switch 154 causes the period of recording seismic-trace data to be displayed by the display 144.

Figure 5B:
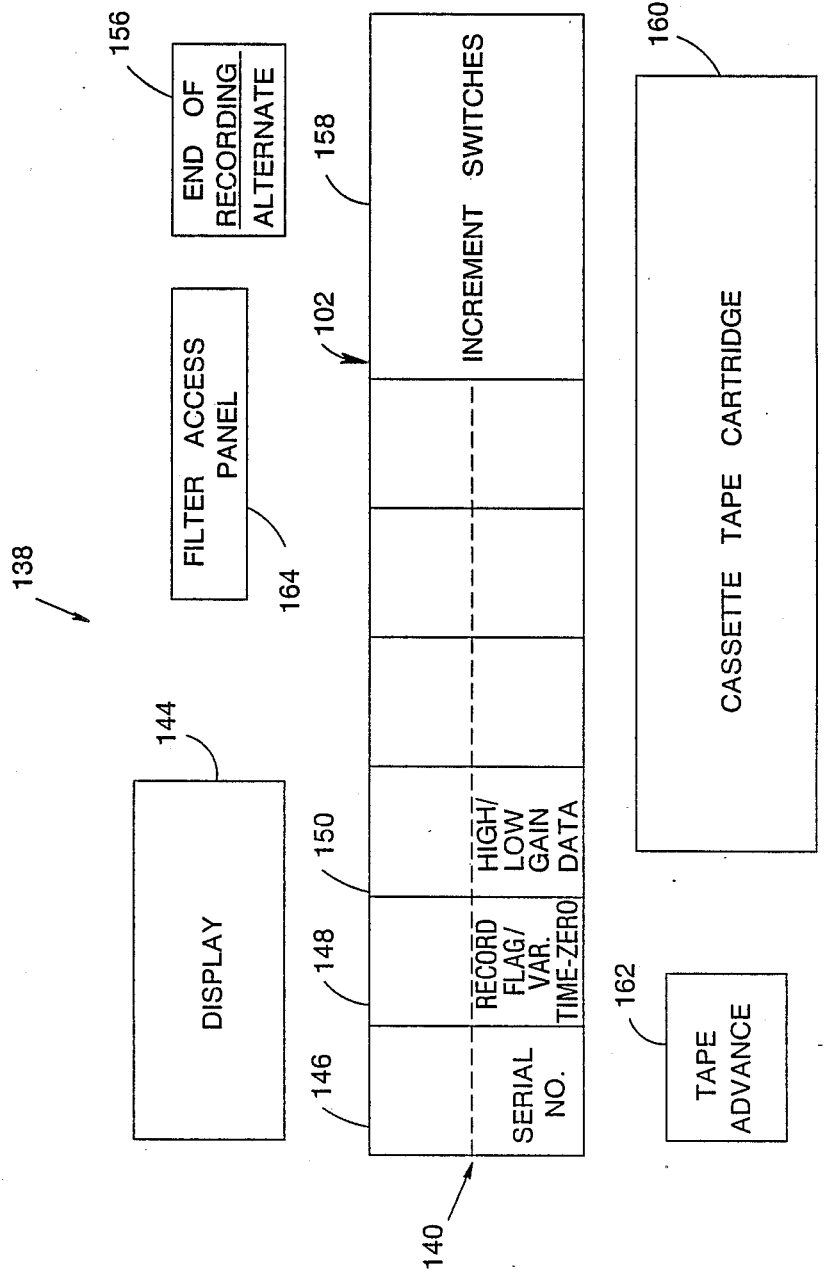
FIG. 5B illustrates the alternate functions of the control panel shown in FIG. 5A.

An END OF RECORDING (EOR) pushbutton 156, in addition to performing the end-of-recording function, serves as an alternate key, much like that found on a hand-held calculator. The alternate functions of the display select switches 140, illustrated in FIG. 5B, are performed whenever the EOR pushbutton 156 is depressed simultaneously with the display select switches 140.

Simultaneous actuation of the EOR pushbutton 156 and the STATION NO. display select switch 146 causes the serial number of the recorder to be displayed by the display 144. Consequently, the serial number of the recorder can be verified. If the EOR pushbutton 156 is released, the display 144 will immediately change, displaying the location of the recorder.

The EOR pushbutton 156 and the FILE NO. display select switch 148 cause record flag and variable time-zero data to be displayed by the display 144 when simultaneously actuated. Therefore, the record flag and variable time-zero data, which relate to instances when the recorder is to be used as a shooter's box with a low energy surface seismic source as will be described later, can be displayed. If the EOR pushbutton 156 is released, the display 144 will immediately change, displaying the number of files.

Simultaneous actuation of the EOR pushbutton 156 and the Y COORDINATE display select switch 150 causes the high/low gain data collected during the last record to be displayed by the display 144. Therefore, the gain-ranging excursions of the amplifier 108 in FIG. 2A during the last seismic-trace signal acquisition cycle can be displayed. If the EOR pushbutton 156 in FIG. 5 is released, the display 144 will immediately change, displaying identifying data selectively entered into the recorder.

There are also alternate functions associated with the display select switches 142, 152, and 154. These alternate functions form the subject matter of a copending patent application of Warmack et al. (T-8539) filed on the same date as this application and assigned to a common assignee and hereby incorporate by reference into this specification to form a part thereof.

The operation of the recorders 421-441 in FIG. 1 is as follows. Known considerations related to field deployment, such as preamplifier and filter settings, adjustment of antenna height, seismometer connectors, etc., generally apply.

With reference to FIG. 5A, the location of the recorder is entered into the recorder at the time that the recorder is deployed by simultaneously actuating the STATION NO. display select switch 146 and manipulating increment switches 158, which set a preprogrammed address representative of the location of the recorder. Similarly, the period of recording seismic-trace data is entered into the recorder by simultaneously actuating the RECORD LENGTH display select switch 154 and manipulating the increment switches 158, which set the recording period in milliseconds. The Y COORDINATE and CONSTANT A display select switches 150 and 152, respectively, can be individually actuated and the increment switches 158 manipulated simultaneously for entering identifying information at the time that the recorder is deployed.

Record flag and variable time-zero data are entered into the recorder at the time that the recorder is deployed by simultaneously actuating the EOR pushbutton 156 and the FILE NO. display select switch 148 and manipulating the appropriate increment switches 158. It should be noted that if the EOR pushbutton 156 is released, the recorder will increment and display the number of files recorded by the magnetic tape cartridge recorder 105 in FIG. 2B.

The file counter is automatically zeroed anytime a magnetic tape cartridge is inserted into a magnetic tape cartridge port 160 as shown in FIG. 5A. The end of recording function is performed by actuating the EOR pushbutton 156 and a TAPE ADVANCE pushbutton 162 simultaneously, which causes an EOR code to be recorded on the magnetic cartridge tape and also causes an "8" to be displayed in the right-most digit of the display 144.

The preamplifier and filter settings can also be adjusted. Access to the preamplifier and filter setting switches is provided through an access port 164.

There are two basic seismic-trace signal acquisition modes for the recorders 421-441 in FIG. 1. Dynamite data processing is one mode. The other mode is stacking data processing.

When used as a dynamite data processing mode shooter's box with a high energy impulsive seismic source, the record flag and variable time-zero data is zeroed so as to prevent early energization of the shooter's circuit 100 in FIG. 2B, thereby avoiding a subsequent invalid recording and uphole time.

When used as a stacking data processing mode shooter's box with a low energy surface seismic source or "studder" shooting, the record flag and variable time-zero data are utilized. The record flag is defined as the left-most digit of the data (most significant digit) and is interrogated only in the stacking data processing shooter's box mode. A zero causes the first initiation of the low energy surface seismic source to be recorded as the pilot signal, for example, while any other number causes the last initiation to be recorded. The remaining three digits comprise the variable time-zero data. Although the variable time-zero data is interrogated when the recorder is selected as a stacking data processing mode shooter's box, only those times between 310 and 750 milliseconds are considered valid. Any invalid time will be ignored, and the shooter's circuit 100 will energize at the normal initiation time, which is immediately after the second transmission from the control means 23 in FIG. 1.

Accordingly, configuration of a stacking data processing mode shotter's box is similar to that of a dynamite data processing mode shooter's box with the following exceptions. Since only one recording per seismic source point is recorded by the magnetic tape cartridge recorder 105 in FIG. 2B, the record flag is set so as to record either the first or last initiation. A zero in the record flag (the most significant digit of the variable time-zero data word) causes the first initiation to be recorded, while any other number causes the last initiation to be recorded. The variable time-zero data, that is, the length of time the shooter's circuit 100 is to be energized after the normal initiation time, is limited to between 310 and 750 milliseconds. This time occupies the remaining three digits of the variable time-zero data word and is entered such that the low energy surface seismic source will be initiated precisely at that time.

In the dynamite data processing mode, collecting high energy impulsive seismic source data with the recorders 421-441 in FIG. 1 is performed as follows. The SPARE transmitted by the control means 23 must contain all zeros, that is, "000," for activating the recorders 421-441 in the dynamite data processing mode. A SPARE word of "1XX" (where X is any number) will cause the activated recorders to weight and vertically stack seismic-trace data. As described earlier, a shooter's call number of 9900 to 9999 is used for activating multiple shooter's boxes. Therefore, if shooter's boxes are to be called independently, as is generally the case with high energy impulsive seismic sources, the recorders will have addresses below 9900. Should the recorders accidentally be activated in the stacking data processing mode, they can be de-activated without consuming magnetic cartridge tape by transmitting "X8X" as the SPARE.

In the stacking data processing mode, the actual recorder configuration for acquiring low energy surface seismic source data is similar to the configuration for collecting high energy impulsive seismic source data with the recorders 422-441. The difference resides in the transmission from the control means 23. The activated recorders determine the particular stacking data processing mode by interrogating the SPARE as shown in Table I.

TABLE I

| SPARE Codes | |
|---|---|
| Digit 1 | |
| 0 | Dynamite (non-stacking) Mode |
| 1 | Stacking Mode |
| Digit 2 | |
| 0 | Normal processing |
| 1 | Call for normalization after stacking, and record on tape at next call (Stacking Mode). |
| 8 | Master reset |

TABLE I-continued

| SPARE Codes | |
|---|---|
| 9 | Call for normalization after stacking, and record on tape immediately thereafter (Stacking Mode). The recorder powers down immediately after recording on tape. |
| Digit 3* | |
| 0 | IPW(0) |
| 1 | IPW(1) |
| 2 | IPW(2) |
| 4 | IPW(4) |

*Default values are IPW(2) for 3, 5, 6, and 7; IPW(0) for 8; and IPW(1) for 9.

With the seismic-trace data processing capabilities and flexibility of the microcomputer circuit included in each of the recorders 421-441 in FIG. 1 located at each seismometer or seismometer group 20, improved seismic-trace data weighting and vertical stacking can be accomplished in the recorders. It has been demonstrated that an inverse power weighting type of technique performs well in the vibroseis type of recording environment as evidenced by the aforementioned copending Smith et al. application. An extensive test performed in Midland, Texas with 12 prototype recorders along side a crew employing an MDS-10 field hardware system manufactured by Geosource, Inc. of Houston, Tex. serves as verification. When heavy road traffic is present, inverse power weighting with exponent two, IPW(2), clearly performs better than the best technique available in the MDS-10.

After the seismic-trace data has been acquired through operation of the activated recorders in either the dynamite data processing mode or the stacking data processing mode as determined by the transmission from the control means 23, the data is recorded on the magnetic cartridge tape. Recorded with the seismic-trace data is the record-header block identification data and recording parameter data transmitted by the control means 23, as well as the identifying and operating information entered in each of the recorders 421-441 at the time of deployment. Recording on the magnetic cartridge tape is preferably in bit-slice format.

Considered in more detail, the SERIAL NO. of the recorder is initially recorded on the magnetic cartridge tape. A 16-bit word is next recorded which comprises a code for the gain of the preamplifier 54 in FIG. 2A (PREAMP GAIN, where the full-scale input can be 400, 200, 100, or 50 millivolts, for example), a bit indicative of whether or not a low-cut filter is operative (LOW CUT FILTER flag), and a bit indicative of whether or not a 60-hertz notch filter is operative (NOTCH FILTER flag). Then CONSTANT B representative of the software program revision level of the recorder is recorded. Any identifying information, such as a seismic source identifier, entered into the recorder at the time of deployment by means of the CONSTANT A display select switch 152 and the increment switches 158 in FIG. 5A, as well as the Y COORDINATE display select switch 150 and the increment switches 158, is recorded next. The period of recording entered by means of the RECORD LENGTH display select switch 154 and the increment switches 158 is then recorded. Recorded next on the magnetic cartridge tape is the record number which can be displayed by the display 144 when the FILE NO. display select switch 148 is actuated. Furthermore, the address of the recorder entered at the time of deployment by means of the STATION NO. display select switch 146 and the increment switches 158 is recorded.

Recorded next on the magnetic cartridge tape is the identifying and operating information, including the record-header block identification data and recording-parameter data, transmitted by the control means 23 in FIG. 1. As described earlier in connection with FIG. 3B, the transmitted record-header block identification data and recording-parameter data includes: FIRST BEGIN STATION; FIRST END STATION; SECOND BEGIN STATION; SECOND END STATION; SHOT POINT CALL; the 16-bit word comprising the transmission number, test flag, and CRC code; FILE NUMBER; SOURCE; the 16-bit word comprising the SOURCE FRACTION and SPARE; ADVANCE TIME, if transmitted; ID1; ID2; ID3; ID4; LINE; a 16-bit word comprising the MONTH and DAY; a 16-bit word comprising the YEAR and AREA1; a 16-bit word comprising AREA2 and AREA3; the 16-bit word comprising the transmission number, test flag, and CRC code; and the END OF HEADER FLAG.

Finally, the seismic-trace data, either in the form of digitized seismic-trace signals for the dynamite data processing mode or, alternatively, digitized seismic-trace signals which have been weighted and vertically stacked in the stacking data processing mode, are recorded on the magnetic cartridge tape. The seismic-trace data comprises a 16-bit word with four bits indicative of the gain of the amplifier 108 in FIG. 2A, and one bit for the sign, and eleven bits for the mantissa of the data.

In order to achieve a cost-effective recorder, instead of adding on external hardware, low power microprocessor and memory circuitry were included in the recorder of the invention. Therefore, the overall advantages of the recorder of the invention have been attained at nominal expense.

There remains a limitation in the amount of seismic-trace data that can be recorded on a commercially available magnetic tape cartridge (approximately 1100 seconds of data). At 20-second records, for example, approximately 55 records can be recorded.

While the invention has been described with a certain degree of particularity, it is manifest that many changes can be made in the details of construction and the arrangement of components without departing from the spirit and scope of this disclosure. It is understood that the invention is not limited to the exemplified embodiments set forth herein but is to be limited only by the scope of the appended claims, including the full range of equivalency to which each element thereof is entitled.

What is claimed is:

1. A portable seismometer group recorder for use in seismic prospecting for processing seismic-trace signals from at least one seismic wave detector comprising:
   (a) memory means in the recorder for storing a plurality of processing instructions for processing the seismic-trace signals, wherein the processing instructions include:
      (i) instructions for weighting seismic-trace signals obtained from a plurality of initiations of a seismic source with inverse power weighting exponents selected from the group including 0, 1, 2, and 4; and
      (ii) instructions for stacking weighted seismic-trace signals;
   (b) means in the recorder responsive to transmitted coded signals for selecting processing instructions from the plurality of processing instructions stored in the memory means; and
   (c) means in the recorder for processing the seismic-trace signals from at least one seismic wave detector in accordance with the selected processing instructions.

2. The recorder of claim 1 further including:
   means in the recorder responsive to coded signals for activating the recorder by connecting the recorder to a supply of electrical power.

3. The recorder of claim 1 further including:
   means in the recorder for digitizing the seismic-trace signals prior to processing.

4. The recorder of claim 1 wherein the processing instructions further include:
   instructions for normalizing the processed seismic-trace signal.

5. The recorder of claim 1 further including:
   data storage means in the recorder for storing the processed seismic-trace signals.

6. The recorder of claim 1 further including: recorder if the time between successive initiations of the seismic source reaches a predetermined time.

7. The recorder of claim 1 further including:
   means in the recorder responsive to transmitted coded signals for storing header block identification data and recording parameter data with the processed seismic trace signals.

8. The recorder of claim 7 wherein the header block identification data and recording parameter data include data selected from the group including:

9. A method for seismic prospecting using a portable seismometer group recorder for processing and recording seismic-trace signals from at least one seismic wave detector, comprising the steps of:
   (a) activating the recorder by connecting the recorder to a supply of electrical power upon receiving first transmitted coded signals;
   (b) transmitting a second coded signal to the recorder and selecting a set of operating instructions from a plurality of operating instructions stored within the recorder, wherein such operating instructions include:
      (i) instructions for weighting the seismic-trace signals from a plurality of initiations of a seismic source with inverse power weighting exponents selected from the group including 0, 1, 2, and 4; and
      (ii) instructions for stacking weighted seismic-trace signals;
   (c) successively sampling and digitizing the seismic-trace signals in the recorder from at least one seismic wave detector, thereby forming seismic-trace data;
   (d) processing the seismic-trace data using the selected processing instructions; and
   (e) storing the processed seismic-trace data in the recorder.

10. The method of claim 9, wherein the operating instructions include:
    instructions for normalizing processed seismic-trace signals.

11. A portable seismometer group recorder for use in seismic prospecting for processing seismic-trace signals from at least one seismic wave detector comprising:

(a) memory means in the recorder for storing a plurality of processing instructions for processing instructions include:
  (i) instructions for weighting seismic-trace signals obtained from a plurality of initiations of a seismic source with inverse power weighting exponents selected from the group including 0, 1, 2, and 4;
  (ii) instructions for stacking weighted seismic-trace signals; and
  (iii) instructions for storing seismic trace signals from a plurality of initiations of a seismic source without weighting and stacking in the recorder;
(b) means in the recorder responsive to transmitted coded signals for selecting processing instructions from the plurality of processing instructions stored in the memory means; and
(c) means in the recorder for processing the seismic-trace signals from at least one seismic wave detector in accordance with the selected procesing instructions.

* * * * *

UNITED STATES PATENT AND TRADEMARK OFFICE
CERTIFICATE OF CORRECTION

PATENT NO. : 4,885,724

DATED : December 5, 1989

INVENTOR(S) : Randol R. Read, Ralph E. Warmack, James M. Farmer, Jerry D. Henshaw, Connie T. Marshall It is certified that error appears in the above—identified patent and that said Letters Patent is hereby corrected as shown below:

Column 13, line 36, delete "the completion" and insert --indicative--.
Column 16, line 65, after the word minute, insert --timer is started to prevent a possible recorder--.
Column 21, line 42, after the word of, insert --recorded--.
Column 22, line 23, Claim 6, after the words after included, insert --means in the recorder for deactivating the--.
Column 22, line 34, Claim 8, after the word including:, insert --seismic source location, time, date, seismic crew identification, recorder location, and recorder identification--.

Signed and Sealed this

Fifteenth Day of January, 1991

*Attest:*

HARRY F. MANBECK, JR.

*Attesting Officer*      *Commissioner of Patents and Trademarks*